Inventor
Jean Bougle

ATTORNEYS

United States Patent Office 3,290,596
Patented Dec. 6, 1966

3,290,596
RATIO OF PERMISSIBLE TO ACTUAL X-RAY LOAD INDICATOR USING PLURAL LOGARITHMIC RESPONSE CIRCUITS
Jean Bougle, Paris, France, assignor to Compagnie Generale de Radiologie, Paris, France, a French body corporate
Filed July 9, 1962, Ser. No. 208,485
Claims priority, application France, July 21, 1961, 208,485
1 Claim. (Cl. 324—140)

The present invention relates to arrangements for protecting electrical circuits or components thereof by measuring the percentage load on the circuits or components and, more particularly, to such an arrangement for use with X-ray tubes.

In X-ray tubes, a considerable quantity of heat is dissipated in the plate. As a result, there is a rise in temperature and this temperature should not exceed a certain value. It is known that the maximum power which can be dissipated in the plate is a function of the time of the radiographic exposure. The relation is expressed in the form of a curve or load graph, the exposure time being marked along the abscissa and the maximum powers $W_M$ along the ordinate.

Protection or safety arrangements have hitherto been proposed for ensuring that the product $W = U \times 1$ is less than or equal to the maximum power $W_M$ given by the load graph for a selected exposure time, where W is the actual power applied to the X-ray tube, U is the high tension applied thereto and I is the intensity of the current flowing through the tube.

The present invention has for an object to provide a protection arrangement which is particularly suitable for use with X-ray tubes and by means of which it is not only possible to control the relationship $W < W_M$, but also to measure the percentage load, that is $100 \times W/W_M$, the time regulation being continuous, while as far as possible eliminating drifts.

From one aspect, the invention consists in an arrangement for protecting an electrical circuit component by measuring the percentage load on the component, comprising two amplifiers for developing electrical voltages proportional respectively to the logarithms of the actual load and the maximum permissible load, and indicator means connected between said amplifiers and having said voltages applied thereto in opposition, for displaying the ratio of the actual load to the maximum permissible load, which ratio is represented by the difference in said voltages, and means operable when said ratio has a predetermined value for producing a signal.

The graphs defining the maximum loads applicable to electrical circuits or components of electrical circuits, in particular X-ray tubes, as a function of time, may, in a system of logarithmic coordinates, be represented to a good approximation by a succession of straight lines.

From another aspect, the invention consists in an arrangement for protecting an X-ray tube by measuring, at any instant, the percentage load on the tube, the load graph of said tube, as a function of time, being resolvable (in logarithmic coordinates) into a number of straight lines, said arrangement having the improvement comprising an amplifier for developing an electrical voltage proportional to the logarithm of the maximum permissible load, said amplifier including a pair of amplifying electronic devices, a voltage divider for applying bias voltage to the control electrode of one of said electronic devices, said voltage divider having logarithmic variation as a function of time and comprising a plurality of resistances corresponding respectively to specified scales of exposure time for the X-ray tube and being selectively connectable to a potentiometer for defining a specified exposure time within any one of said scales, and means for applying a fixed bias voltage to the control electrode of the other electronic device.

Experiment proves that in the case of several tubes, load graphs relating to each focus may be deduced from one another by simple translation according to the axis of the coordinates (axis of the admissible loads).

According to a feature of the invention, the adaptation of the abovementioned arrangement to different focuses of X-ray tubes is obtained by prior regulation of the bias on the control electrode of the said one amplifying electronic device. This enables a logarithmic voltage divider to be used which is common to all the focuses of a given tube.

According to another feature of the invention, the voltage proportional to the logarithm of the actual load on the X-ray tube is obtained by means of a second amplifier of which the bias voltages applied to the control electrodes of its two amplifying electronic devices are proportional, on the one hand, to the logarithms of the voltage applied to the X-ray tube and, on the other hand, to the logarithm of the intensity of the current flowing therethrough.

In order that the invention may be more readily understood, reference will now be made to the accompanying drawings, in which.

Figure 1:
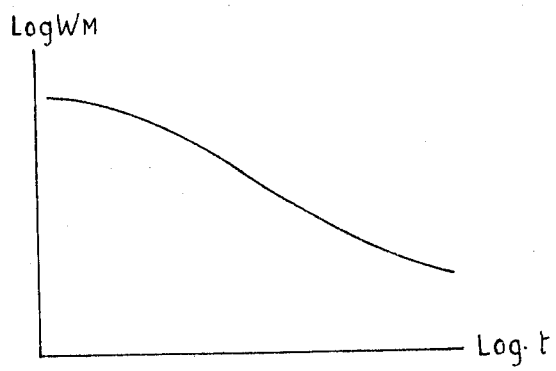
FIGURE 1 is the load graph of an X-ray tube.

Referring to FIGURE 1, the logarithms of exposure times $t$ are marked along the abscissa of the load graph and the logarithms of the maximum powers $W_M$ which can be applied to the X-ray tube at the exposure times are marked along the ordinate. A radiographic operation must satisfy the relation, $W < W_M$, where W is the actual power applied to the X-ray tube, that is the product of the voltage U applied to the tube and the intensity I of the current flowing therethrough, and the load graph serves to enable an operator not to exceed the maximum power for a particular exposure time and thereby damage the tube.

Figure 2:
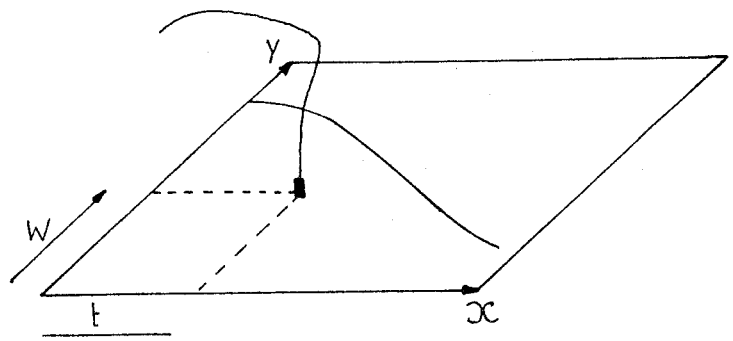
FIGURE 2 is a schematic diagram of a known type of electro-mechanical device for protecting an X-ray tube against over-loading.

Numerous arrangements are known by which it is possible to follow the load graph. The arrangements may be classed in two categories. In the first category, an example of which is illustrated in FIGURE 2, the load graph is marked on a conductive surface S over which an electrical contact C is displaced along the abscissa as a function of the exposure time $t$ and along the ordinate as a function of the applied power W.

In the second category, W and $W_M$ are expressed in similar form by electrical voltages. For example, a voltage representing the product $W = U \times I$ is produced by means of a transformer and switch. As indicated above, in this product U and I represent respectively the values of the voltage and the current intensity applied to the X-ray tube. A fraction of this voltage is tapped off by a potentiometer, the position of the sliding contact of which is a function of the exposure time $f(t)$, and it is verified that this tapped-off voltage does not exceed a fixed value.

In the case of an installation having to supply several X-ray tubes, the load graphs of which are different, a switch may be used to modify the distribution of the ohmic values of the potentiometer, as a function of the exposure time $t$, according to the tube used.

Generally speaking, radio diagnostic generators do not allow for selection of the exposure time $t$ except for a limited number of values which generally form a geometric progression. Since the regulation of the time $t$ is discontinuous, the fraction of the voltage representing $W$ is tapped-off by means of a simple stud switch.

However, if the generator is provided with means for continuously regulating the times $t$, for example, from 0.001 to 10 seconds, it is necessary to use two controls. One of these controls is a potentiometer graduated from 1 to 10, and the other is a switch enabling the indication of the former to be multiplied by 0.001, 0.01, 0.1 or 1 second. In this case, the system enabling a fraction of the voltage, which represents $W$, to be tapped-off as a function of the time becomes very complex.

Finally, the detector by which it is possible to control the relationship $W<W_M$ should have a high internal resistance so as not to disturb the operation of the circuits located before it. It, therefore, becomes necessary to introduce a direct current amplifying stage and this may cause drifts in the time if it is not specially designed.

An object of the present invention consists in using two identical amplifiers, one for producing a voltage proportional to log $W=$ log $(U\times I)$ and the other for producing a voltage proportional to log $W_M$, where $W_M=f(t)$, to put these two voltages in opposition so as to measure the ratio: $100W/W_M$ and to verify the relationship $$W<W_M$$

Figure 3:
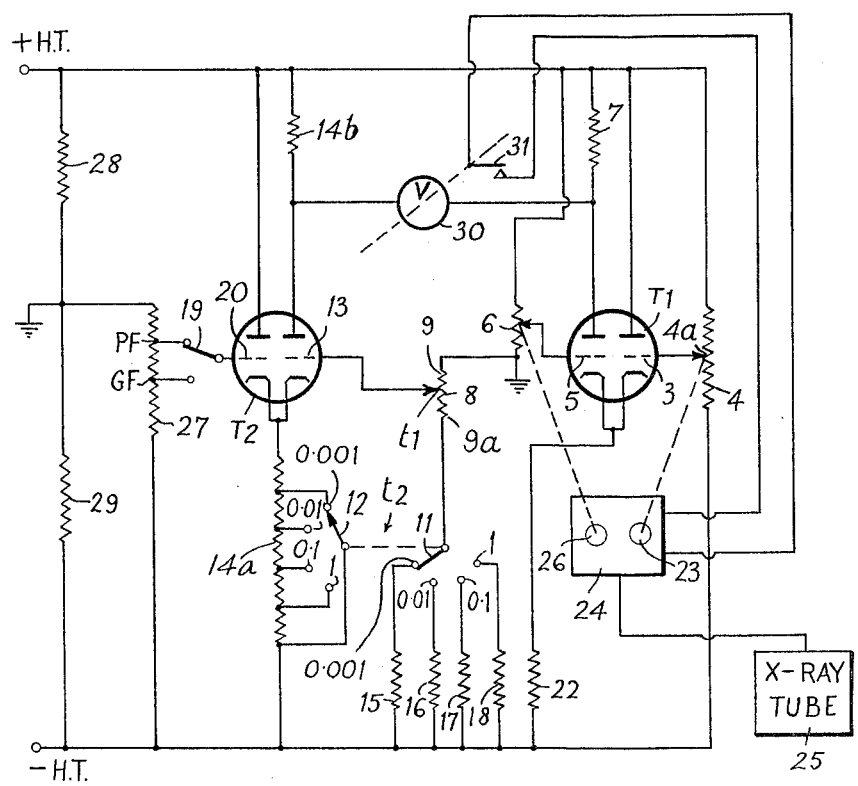
FIGURE 3 is the circuit diagram of a protection arrangement according to the invention.

The arrangement, according to the invention, illustrated in FIGURE 3 comprises two double triodes $T_1$ and $T_2$ which are supplied from the same high voltage source +H.T., −H.T. and constitute the two identical amplifiers.

The plate of the right-hand triode of the double triode $T_1$ is directly connected to +H.T. whilst the plate of the left-hand triode is connected to +H.T. by a plate resistance 7. The cathodes of $T_1$ are connected to −H.T. by a common cathode resistance 22. Connected across the high tension source is a potentiometer 4 which has its sliding contact 4a connected to the grid 3 of the double triode $T_1$ for applying a biasing voltage to this grid. Movement of the contact 4a is controlled by a knob 23 of the power supply control apparatus 24 for the X-ray tube 25. The knob 23 controls the intensity $I$ of the current flowing through the X-ray tube and is arranged to control the contact 4a in such a manner that the voltage applied to the grid 3 is negative and proportional to the logarithm of the selected value of the current intensity. Variation of the voltage applied to this grid therefore varies the voltage across the common cathode resistance 22 and hence the conductance of the left-hand triode of $T_1$ and the voltage across the plate resistance 7.

The grid 5 of the double triode $T_1$ is biased by being connected to the sliding contact of a potentiometer 6 connected between +H.T. and ground. Movement of the sliding contact of this potentiometer is controlled by a knob 26, which controls the supply of high voltage $U$ to the X-ray tube, in such a manner that the voltage applied to the grid 5 is positive and proportional to the logarithm of the selected value of high voltage applied to the X-ray tube. Variation of the voltage applied to the grid 5 therefore also varies the conductance of the left-hand diode of $T_1$ and hence the voltage across the plate resistance 7.

Consequently, it is possible to obtain across the plate resistance 7, by suitably selecting the scales, a voltage proportional to log $U+$log $I=$log $(U\times I)=$log $W$.

The plate of the left-hand triode of the double triode $T_2$ is directly connected to +H.T. whilst the plate of the right-hand triode is connected to +H.T. by a plate resistance 14b. The cathodes of this double triode are connected to −H.T. by a common cathode resistance 14a. Biasing voltage is applied to the grid 13 of the right-hand triode by a logarithmic potentiometer 8, to the sliding contact $t_1$ of which the grid 13 is connected. The potentiometer 8 is connected between ground and the movable contact 11 of a switch $t_2$ having two movable contacts 11 and 12. The movable contact 11 is selectively engageable with any one of four fixed contacts which are connected respectively to −H.T. by resistances 15–18. The movable contact 12 is connected to −H.T. and, when the contact 11 is in engagement with one of its associated fixed contacts, the contact 12 is also in engagement with a corresponding one of four fixed contacts which are respectively connected to spaced tappings on the cathode resistance 14a.

The double triode $T_2$ operates to produce a voltage proportional to log $W_M$, where $W_M=f(t)$. As mentioned previously, in an X-ray generator provided with continuous regulation for exposure time $t$, for example, from 0.001 to 10 seconds, it is necessary to use two time controls and, in this embodiment, these are provided by the potentiometer 8 and the switch $t_2$. The position of the sliding contact $t_1$ of the potentiometer 8 is indicated on a scale (not shown) graduated from one to ten and the switch $t_2$ enables the reading of the sliding contact $t_1$ to be multiplied by 0.001, 0.01, 0.1 or 1 second depending on which one of the fixed contacts (appropriately indicated in FIGURE 4 with the time values) is engaged by the movable contacts 11 and 12. In the apparatus shown, the arrangement of the sliding contact $t_1$ is such that, when $t_1$ is at 9, the first graduation is indicated and, when $t_1$ is at 9a, the tenth graduation is indicated.

The grid 20 of the left-hand triode of the double triode $T_2$ is connected to the movable contact of a switch 19 which is selectively operable to connect this grid to either one of two tappings PF, GF on a resistance 27 in order to apply bias to the grid. As will be hereinafter described, the tapping to which the grid 20 is connected depends on the focus of the X-ray tube. The resistance 27 is connected between −H.T. and the junction of two resistances 28, 29 which constitute a voltage divider circuit across the high voltage source. The junction of the resistances 28, 29 is also connected to ground and the potential divider thus determines the potentials of +H.T. and −H.T. relative to ground.

The graph of FIGURE 5 shows the variation of the function $W_M=f(t)$ in logarithmic coordinates. The points A, B, C, D and E correspond, respectively, to 0.001, 0.01, 0.1, 1 and 10 seconds. When these values are selected, the first graduation on the scale associated with the potentiometer 8 is indicated and the sliding contact $t_1$ of this potentiometer is at 9, that is the grid 13 of the double triode $T_2$ is at zero potential. By suitably regulating the different parts of the cathode resistance 14a, it is then possible to obtain voltages across the plate resistance 14b which are proportional to log $W_M$ and correspond to the points A, B, C, D and E. If a particular position is selected for the switch $t_2$ (0.01 for example, corresponding to point B) the movable contact 11 of $t_2$ connects the resistance 16 in circuit.

By subsequently moving the contact $t_1$ from 9 to 9a, the voltage obtained across the plate resistance 14b is decreased. It then suffices to regulate the resistance 16 so that when the sliding contact $t_1$ of potentiometer 8 is at 9a, that is when the selected value of the time is 10 times 0.01, i.e. 0.1 second, the voltage obtained across the plate resistance 14b is proportional to log $W_M$ for point C of the graph.

By using a logarithmic potentiometer for the potentiometer 8, it will be seen that the device follows the graph very closely since the output voltage representing log $W_M$ is given by the straight part BC. The operation is the same for the various positions of the switch $t_2$. Finally, a voltage is obtained across the plate resistance 14b which is proportional to the values of log $W_M$ given by the broken line in A, B, C, D, E.

Figure 4:
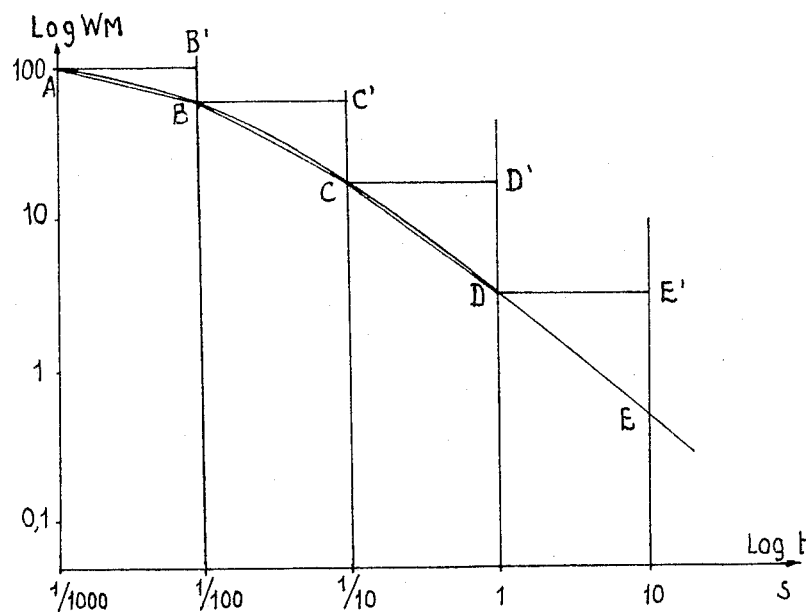
FIGURE 4 is a diagram illustrating the performance of the protection arrangement shown in FIGURE 3.

When several X-ray tubes are provided, it is possible, by a suitable switching operation, to provide a set of resistances, such as 14, 15, 16, 17 and 18, suitable for each tube. However, the change-over from one tube to another may also be simplified. Indeed, if the usual exposure times are considered, experience shows that in order to pass from the load graph of one X-ray tube to another graph of a tube having a different focus, it is sufficient to cause the first graph (translated into logarithmic coordinates) to undergo a translation along the coordinate axes. This property is utilised in the arrangement described by acting on the grid 20 of the triode $T_2$ through the switch 19. In FIGURE 4, the switch 19 is shown as having two positions GF, long focus, and PF, short focus, but it will be understood that various other positions may be adopted corresponding to different X-ray tubes.

In order to measure the ratio $100W/W_M$, that is the percentage load, it is sufficient to arrange a voltmeter 30 between the resistances 14b and 7. In effect, the voltage across the terminals of resistance 7 is proportional to log $W=\log (U \times I)$. The voltage across the terminals of resistance 14b is proportional to log $W_M$. The voltage across the terminals of the voltmeter 30 is therefore proportional to log $W_M - \log W$, or log $W_M/W$.

When $W=W_M$, the load is 100%, that is log $W_M=0$, and the voltage across the terminals of the voltmeter is zero. The graduation indicates 100%.

When $W=0.5W_M$ for example, the load is 50% and the voltage across the terminals of the voltmeter is proportional to log 2. The voltmeter may, therefore, be directly graduated in percentage load. Finally, in order to ensure the relationship $W<W_M$, it is sufficient to arrange a contact 31 on the movable mechanism of the voltmeter which when the load exceeds 100% causes the control apparatus 24 to operate to prevent overload of the X-ray tube 25.

It is important to note that the tubes $T_1$ and $T_2$ are identical, as are the plate resistances 7 and 14b. The high voltage supply is common to both tubes. This symmetry, independent of the advantages proper to each of the two amplifiers, makes it possible to reduce the drifts to a minimum.

It is to be understood that the embodiment hereinbefore described is only given by way of example and that modifications can be made thereto without departing from the scope of the invention as defined by the appended claim.

I claim:

In X-ray apparatus having first and second variable means for controlling respectively the operating voltage applied to the X-ray tube and the intensity of the current flowing therethrough, a protection arrangement comprising a voltage supply, first and second substantially identical amplifiers each including two amplifying electronic devices connected in parallel across said supply, a first voltage divider connected across said voltage supply for applying biassing voltage to the control electrode of one of said electronic devices of said first amplifier, said first voltage divider having logarithmic variation as a function of the exposure times for the X-ray tube and comprising a plurality of resistances which correspond respectively to different ranges of exposure time and are selectively connected to a logarithmic potentiometer having an adjustable contact for defining a specified exposure time within any one of said ranges, said adjustable contact being connected to said control electrode, a resistance common to both current flow paths through said two electronic devices of said first amplifier and having spaced tappings thereon corresponding respectively to said different ranges of exposure time, switch means for selectively connecting said plurality of resistances to said logarithmic potentiometer and said corresponding tappings to said voltage supply, means for applying a fixed biassing voltage to the control electrode of the other electronic device of said first amplifier, whereby said first amplifier produces a voltage output proportional to the logarithm of the maximum permissible load on said X-ray tube, means operative by said first variable means for applying a biassing voltage proportional to the logarithm of the operating voltage applied to the X-ray tube to the control electrode of one of said electronic devices of said second amplifier, means operative by said second variable means for applying a biassing voltage proportional to the intensity of the current flowing through said X-ray tube to the control electrode of the other electronic device of said second amplifier, whereby said second amplifier produces a voltage output proportional to the logarithm of the actual load on said X-ray tube, and indicator means connected between said two amplifiers and having said voltage outputs proportional to the logarithms of the maximum permissible load and actual load applied thereto in opposition, said indicator means therefore displaying the ratio of the maximum permissible load to the actual load, and means operable to produce a signal when said ratio has a predetermined value.

References Cited by the Examiner
UNITED STATES PATENTS

| | | | |
|---|---|---|---|
| 2,244,369 | 6/1941 | Martin | 235—195 X |
| 2,502,269 | 3/1950 | Nemet | 250—95 |
| 2,747,796 | 5/1956 | Patterson | 235—195 |
| 2,836,728 | 5/1958 | Maurice | 250—95 |

OTHER REFERENCES

Publication, Journal of the Franklin Institute, vol. 270, No. 3, September 1960, pp. 171 and 172.

WALTER L. CARLSON, *Primary Examiner.*

FREDERICK M. STRADER, *Examiner.*

C. F. ROBERTS, R. V. ROLINEC, *Assistant Examiners.*